United States Patent [19]

Hashimoto et al.

[11] Patent Number: 5,205,388
[45] Date of Patent: Apr. 27, 1993

[54] CLUTCH COVER ASSEMBLY

[75] Inventors: Yasuyuki Hashimoto; Toru Hamada; Hiroshi Takeuchi, all of Neyagawa, Japan

[73] Assignee: Kabushiki Kaisha Daikin Seisakusho, Osaka, Japan

[21] Appl. No.: 773,640
[22] PCT Filed: Mar. 7, 1991
[86] PCT No.: PCT/JP91/00306
  § 371 Date: Nov. 18, 1991
  § 102(e) Date: Nov. 18, 1991
[87] PCT Pub. No.: WO91/14879
  PCT Pub. Date: Oct. 3, 1991

[30] Foreign Application Priority Data
  Mar. 23, 1990 [JP] Japan .................. 2-30346[U]

[51] Int. Cl.⁵ .......................................... F16D 13/71
[52] U.S. Cl. .............................. 192/89 B; 192/109 A
[58] Field of Search ..................... 192/109 A, 89 B

[56] References Cited
U.S. PATENT DOCUMENTS 3,323,624  6/1967  Maurice ........................... 192/89 B
4,291,792  9/1981  Henao ......................... 192/109 A X
4,678,071  7/1987  Ball et al. ................... 192/109 A X
4,770,282  9/1988  Maycock et al. ........... 192/109 A X
5,054,598 10/1991  Tojima ........................ 192/89 B X

FOREIGN PATENT DOCUMENTS 0249469 12/1987  European Pat. Off. .......... 192/89 B
0271382  6/1988  European Pat. Off. .......... 192/89 B
2019957 11/1979  United Kingdom .............. 192/89 B
WO90/01642  2/1990  World Int. Prop. O. ........ 192/89 B

*Primary Examiner*—Rodney H. Bonck
*Attorney, Agent, or Firm*—Armstrong, Westerman, Hattori, McLeland & Naughton

[57] ABSTRACT

A clutch cover assembly having an annular bearing plate 27 located between a pressure plate 13 and a diaphragm spring 14 in coaxial relation to them. The bearing plate 27 integrally has a releasing fulcrum point 30 which is disposed in a clearance S between the pressure plate 13 and a back face of a projection 25. The releasing fulcrum point 30 is distorted in axial direction to elastically supports an outer peripheral part of the diaphragm spring 14. The releasing fulcrum point 30 and the loading fulcrum point 26 are arranged on the same circumference.

2 Claims, 4 Drawing Sheets

5,205,388

CLUTCH COVER ASSEMBLY

FIELD OF THE INVENTION

This invention relates to a clutch cover assembly allowing easy engagement of the clutch.

DESCRIPTION OF THE RELATED ART

Generally, during transition from a clutch disengaged state to its engaged state, a ride comfort is improved and a driver can perform clutch engaging operation more easily when a torque at initial engagement of clutch increases smoothly.

It is well known that a pair of friction facings can be coupled by a cushioning plate having an elasticity in an axial direction so that the torque at an initial engagement of the clutch can be increased smoothly. However, the cushioning plate must hold a high rigidity because the cushioning plate is also an element for transmitting a torque from the friction facings to a spline hub. Therefore, the improvement in drive feeling at the initial engagement of clutch by means of the cushioning plate is limited.

There has recently been proposed a clutch cover assembly having a construction in which an annular wave wire ring waved in the axial direction has been interposed between a projection on a back face of a pressure plate and an outer peripheral part of a diaphragm spring, and this outer peripheral part of the diaphragm spring has been seated on the wave wire ring, so that the torque at initial engagement of the clutch is increased smoothly (Japanese Examined Utility Model Published Application No. 59-2337, for example).

In this construction, however, the full load of the diaphragm spring is active to constantly urge the wave wire ring at time of clutch engagement, so that the wave wire ring may sometimes be put under a fully-compressed state, and a spring force of the wave wire ring is apt to be weakened. Accordingly, a spring constant of the wave wire ring is apt to be changed when operation of the ring is continued.

Further, in the above construction, a fulcrum point of the diaphragm spring is located at a position where an urging force of the diaphragm spring is balanced with a resilient force of the wave wire ring. Therefore, it is hard to define a distance from a friction surface between a clutch facing and a pressure plate to the fulcrum point during engaging and disengaging operations of the clutch. Further, there is a possibility that the wave wire ring is weakened to cause a shortening of the distance during a long period of operation.

It is also well known, wherein a loading fulcrum point which supports the outer peripheral part of the diaphragm spring at a time of clutch engagement and an elastic body which elastically supports the above outer peripheral part of the diaphragm spring at time of clutch disengagement are provided in coaxial relation to a projection of a pressure plate. (Japanese Examined Utility Model Published Application No. 45-15366, for example).

According to the above construction, the outer peripheral part of the diaphragm spring is seated on the loading fulcrum point of the projection, so that the durability of the elastic body can be improved and a high precision can be maintained.

In the above construction, however, the elastic body is located at a position nearer to an inner peripheral side than the loading fulcrum point. Consequently, an axial deformation of the elastic body becomes comparatively large so that a distortion over time becomes large. Therefore, an allowance for strain of the elastic body changes to cause a change in the disengaging characteristic. For this reason, it has been necessary to frequently exchange parts.

Further, there has been disclosed a clutch cover assembly in Japanese Unexamined Published Application No. 62-224729. The clutch cover assembly comprises a pressure plate, a projection extending at a backside of the pressure plate in the same circumferential direction with a clearance between them and projecting to an outer peripheral part of a diaphragm spring, a wire ring disposed at a tip end of, and in coaxial relation to the projection, and the diaphragm spring the outer peripheral part of which is seated on the wire ring, the diaphragm spring including a rib extending in radial direction to protrude into a central part of the clearance, the rib making contact with a portion facing on the central part of the clearance of the wire ring so that the rib can press the wire ring to obtain an axial cushioning characteristic.

In this construction, however, the rib extending in the clutch radial direction is formed on the diaphragm spring integrally or substantially integrally. Therefore, there is a possibility that a spring characteristic is not exactly defined if the rib is not oriented precisely on the central part of the clearance. The rib must be worked at a very accurate position, and assembly work of the pressure plate and diaphragm spring must be carried out extremely precisely when the above construction is used, so that its manufacturing cost will become very high. A very slight deviation would cause a change in spring characteristic, so that it is difficult to apply this construction to the clutch cover assembly to which shocks and vibrations are applied easily.

An object of the present invention is to solve the above-mentioned problems.

SUMMARY OF THE INVENTION

According to the present invention, there is provided a clutch cover assembly which comprises an annular pressure plate, and a diaphragm spring disposed at a backside of and in coaxial relation to the pressure plate, the pressure plate having a plurality of projections extending at a backside of the pressure plate in the same circumferential direction with a clearance between them and projecting to an outer peripheral part of the diaphragm spring, the projections having a loading fulcrum point supporting the outer peripheral part of the diaphragm spring at time of clutch engagement, wherein an annular bearing plate is installed between the pressure plate and the diaphragm spring in coaxial relation to them, the bearing plate integrally having a releasing fulcrum point which is disposed in the clearance and elastically supporting the outer peripheral part of the diaphragm spring by being distorted in the axial direction, and the releasing fulcrum point and the loading fulcrum point being arranged on the same circumference.

In the present invention, the outer peripheral part of the diaphragm spring is seated on the loading fulcrum point of the projection to press the pressure plate when the clutch is engaged.

The outer peripheral part of the diaphragm spring is seated on the releasing fulcrum point of the bearing plate when the clutch is disengaged (during a transition period from the clutch disengaged state to its engaged state). The releasing fulcrum point transmits the urging force of the diaphragm spring smoothly to the pressure plate while moderating the force.

DESCRIPTION OF THE PREFERRED EMBODIMENT

Figure 1:
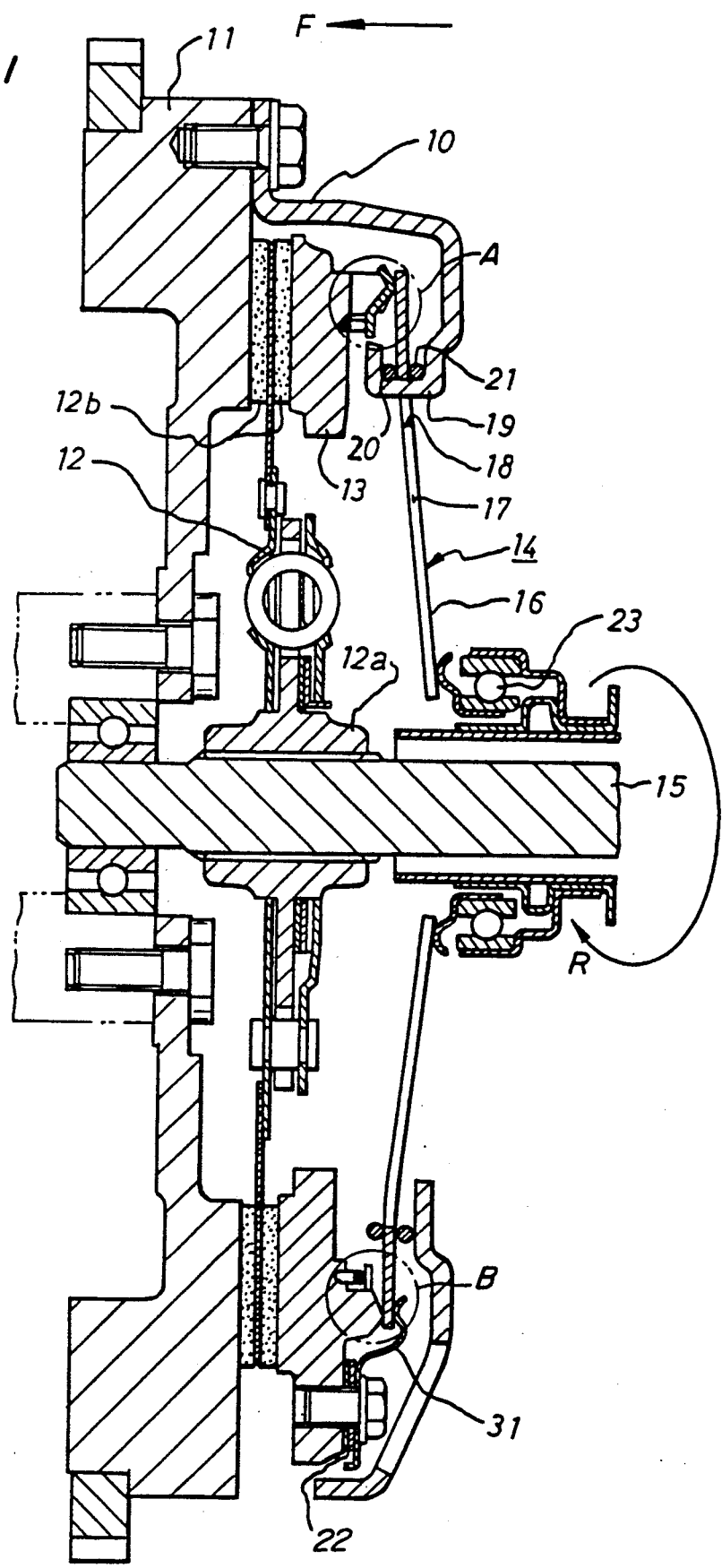
FIG. 1 is a vertical sectional view of the present invention showing an engaged state of clutch.

FIG. 1 shows the vertical sectional view of the present invention, a left side of the figure is assumed as a front side.

As shown in FIG. 1, an outer peripheral part of a clutch cover body 10 of the present invention is secured to an engine-side annular flywheel 11 in coaxial relation to it. A clutch disc 12, a pressure plate 13 and a diaphragm spring 14 are installed in the clutch cover body 10, respectively, in this order from the flywheel 11 side. An output shaft 15, which also forms an input shaft of a transmission (not shown), fits into splines in a boss 12a of the clutch disc 12.

The diaphragm spring 14 integrally has plural tongue-like portions 16 extending to its center, and includes square openings 18 at radial outward ends of slits 17 located between the tongue-like portions 16. Tabs 19 formed at inner peripheral ends of the clutch cover body 10 extend into the square openings 18, and the tabs 19 hold the diaphragm spring 14 through a pair of wire rings 20 and 21. 22 denotes an elastic strap, one end of which is secured to an outer peripheral part of the pressure plate 13 and the other end of which is secured to an inside face of the clutch cover body 10. The elastic strap 22 is an element which couples the pressure plate 13 to the clutch cover body 10 while slightly urging it toward a clutch disengaging position and transmits a torque of the clutch cover body 10 to the pressure plate 13. 23 denotes a well-known release bearing.

Figure 1A:
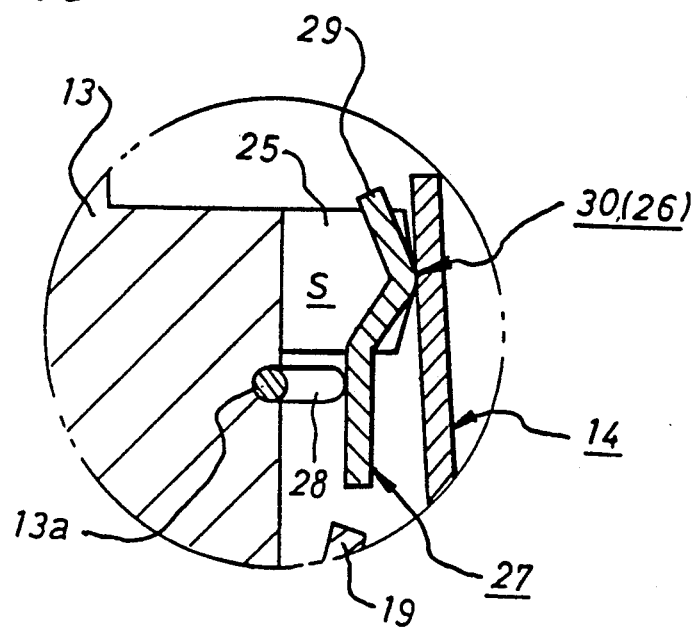
FIG. 1a and FIG. 1b are partially enlarged views of FIG. 1.
Figure 1B:
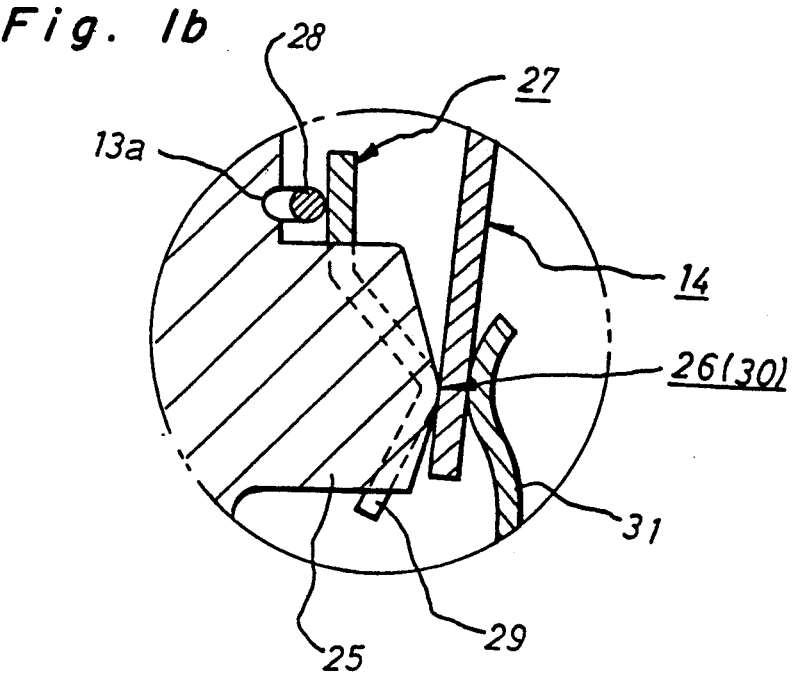

FIG. 1a is an enlarged view of A-part of FIG. 1 and FIG. 1b is an enlarged view of B-part of FIG. 1. Eight projections 25, for example, extending in the same circumferential direction with specified spaces S left between them, are formed integrally on a back face of the pressure plate 13.

A loading fulcrum point 26 extending in a circumferential direction is integrally formed at a rear end of each projection 25. Under the illustrated clutch engaged state, the outer peripheral part of the diaphragm spring 14 is seated on the loading fulcrum point 26 so as to urge the pressure plate 13 forward around the loading fulcrum point 26.

Figure 2:
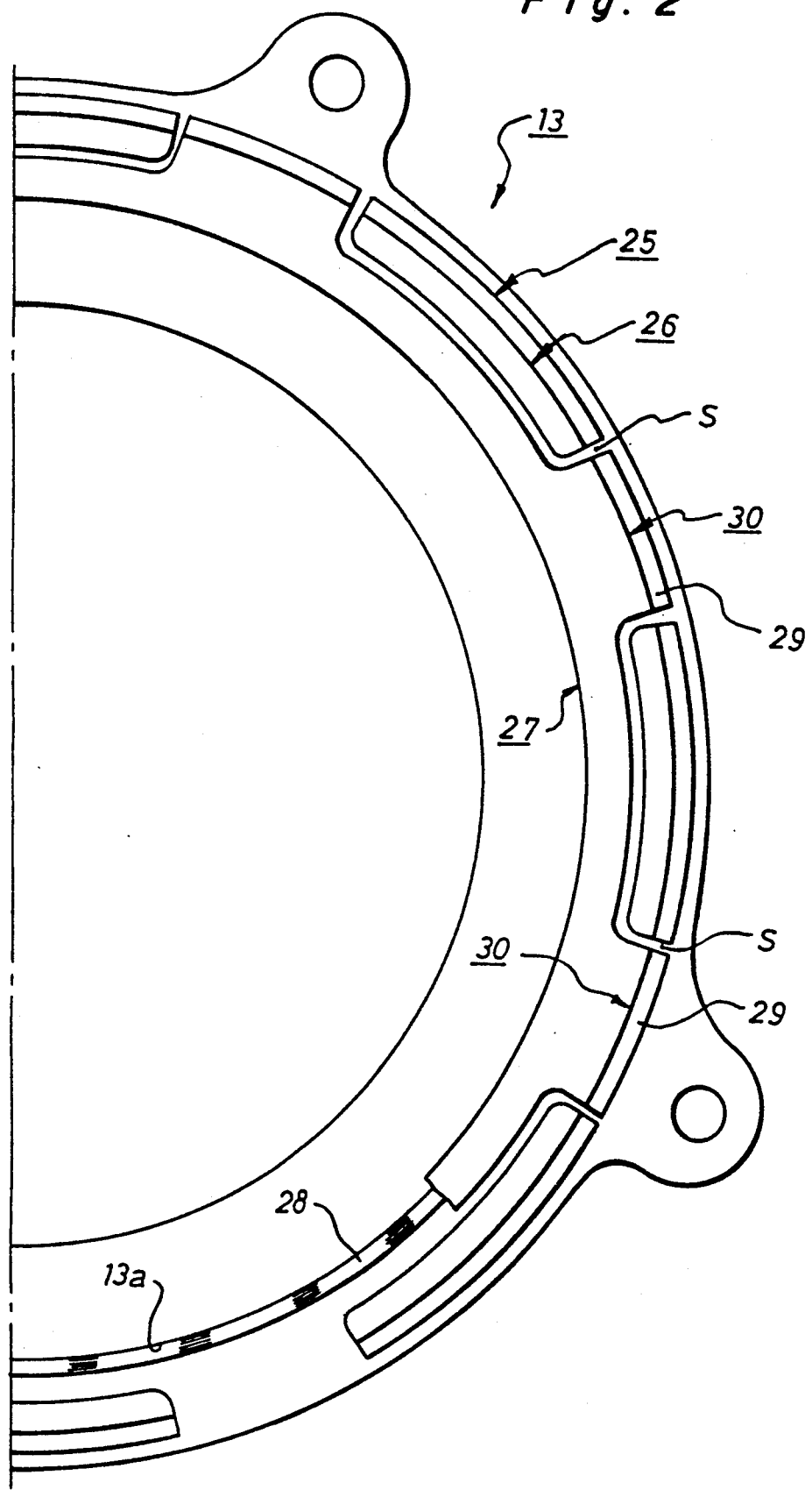
FIG. 2 is a schematic partial view showing a backside of a pressure plate of FIG. 1.

As shown in FIG. 1a and FIG. 2, an annular bearing plate 27 is installed at an inner peripheral side of each projection 25 in coaxial relation thereto. The bearing plate 27 is made of material having a high rigidity such as spring steel, for example.

A wave wire ring 28 is compressedly disposed between the bearing plate 27 and a back face of the pressure plate 13 so as to fit in an annular groove 13a of the pressure plate 13. The wave wire ring 28 is formed in a wave shape in the axial direction is elastically flexible. Accordingly, the bearing plate 27 is flexibly located by the wave wire ring 28 in the axial direction as described later.

A lever 29, which extends outwardly in the radial direction toward the clearance S between the projections 25, is provided integrally on an outer peripheral edge of the bearing plate 27. The lever 29 is bent at its substantially intermediate sectional portion to project backward, so as to form a releasing fulcrum point 30. Here, the releasing fulcrum point 30 and the loading fulcrum point 26 stand in the same circumference as illustrated by FIG. 2. Therefore, under the clutch engaged state shown in FIG. 1, the outer peripheral part of the diaphragm spring 14 is seated on the loading fulcrum point 26 while contacting with the lever 29.

Under this state, an urging force of the diaphragm spring 14 is transmitted from the lever 29 through the bearing plate 27 itself to the wave wire ring 28, so that the wave wire ring 28 is being compressed by a specified amount. In a clutch disengaging operation which will be described later in detail the releasing fulcrum point 30 of the lever 29 becomes a fulcrum point of the diaphragm spring 14. Accordingly, the urging force of the diaphragm spring 14 is smoothly transmitted to the pressure plate 13 while being moderated, during a transition period from the clutch disengaged state to the clutch engaged state of FIG. 1.

The outer peripheral part of the diaphragm spring 14 is held, for example, by a well-known clip 31 between it and the loading fulcrum point 26 as shown by FIG. 1. Consequently, there is no chance for the diaphragm spring 14 to leave the releasing fulcrum point 30 of the lever 29 in the engaging and disengaging operations of clutch, so that the pressure plate 13 always operates integrally with the diaphragm spring 14.

According to the above-mentioned construction, the outer peripheral part of the diaphragm spring 14 is seated on the loading fulcrum point 26 while urging the lever 29 forward to some extent, at the time of the clutch engaged state shown in FIG. 1. By this arrangement, the diaphragm spring 14 urges the pressure plate 13 to the flywheel 11 side, and the pressure plate 13 in turn presses friction facings 12b of the clutch disc 12 onto the flywheel 11. Under the circumstances, a torque in a direction of R is transmitted from the flywheel 11 through the clutch disc 12 to the output shaft 15.

When a clutch engaging/disengaging mechanism (not shown) is operated, the release bearing 23 is moved to the front side to press a back face of inner peripheral edge of the diaphragm spring 14. The outer peripheral part of the diaphragm spring 14 is thereby moved backward by leverage around a pair of the wire rings 20 and 21, so that the pressure plate 13 is also moved backward to release the friction facings 12b. The clutch is disengaged by this operation. Under this state, the outer peripheral part of the diaphragm spring 14 moves backward to cause the diaphragm spring 14 to leave the loading fulcrum point 26 by a cushioning amount of the wave wire ring 28, and at the same time the bearing plate 27 extends backward while keeping the releasing fulcrum point 30 in contact with the outer peripheral part of the diaphragm spring 14. For this reason, the outer peripheral part of the diaphragm spring 14 stands still at a position where the clutch is completely disengaged while being seated on the releasing fulcrum point 30 of the lever 29.

Then, when the release bearing 23 is moved backward by the clutch engaging/disengaging mechanism in order to engage the clutch from its disengaged state, the outer peripheral part of the diaphragm spring 14 presses the pressure plate 13 to the flywheel 11 side through the releasing fulcrum point 30 of the lever 29. The urging force of the diaphragm spring 14 is transmitted through the lever 29 of the bearing plate 27 to the wave wire ring 28 in this instance, so that the pressing force of the diaphragm spring 14 is moderated by the elastic force of the wave wire ring 28. Consequently, the torque of the flywheel 11 is also transmitted smoothly to the friction facings 12b and the initial torque at time of clutch engagement is increased smoothly.

Since the loading fulcrum point 26 and the releasing fulcrum point 30 are disposed on the same circumference in the present invention, an axial displacement of the wave wire ring 28 is small as compared with a conventional construction. Therefore, a permanent set of the wave wire ring 28 is small even after a long period of use, and this also results in a small change over time of the cushioning mechanism. Further, a change in the releasing characteristic can be decreased to a minimum. The wave wire ring 28 is resistant to weakening, so that the durability of unit itself can be improved. Moreover, since the outer peripheral part of the diaphragm spring 14 is in contact with the loading fulcrum point 26 when the clutch is engaged, an axial misalignment is restrained by the loading fulcrum point 26 so that a distance between fulcrum points can be maintained more accurately.

In addition, the releasing fulcrum point 30 is composed of the bearing plate 27 located between the pressure plate 13 and the diaphragm spring 14 in coaxial relation thereto. For that reason, the assembly work can be simplified and the manufacturing cost can be reduced in spite of the above high accuracy obtainable.

According to the present invention, since the releasing fulcrum point 30 is formed on the annular bearing plate 27, the releasing fulcrum point 39 tends to maintain the same circumferential position even when some shocks or vibrations are applied. Therefore, the present invention can be carried out more easily than the conventional constructions. Further, the releasing fulcrum point 30 may be faced on any position of the clearance S as long as it is disposed on the same circumference as that of the loading fulcrum point 26, so that an error can be permitted to some extent from the viewpoint of accuracy. This also results in carrying out the invention.

When carrying out the invention including the construction as explained in FIG. 1 and FIG. 2, a wave washer or a coned disc spring etc. may be used in place of the wave wire ring 28. In such a case, the annular groove 13a may be omitted.

Figure 3:
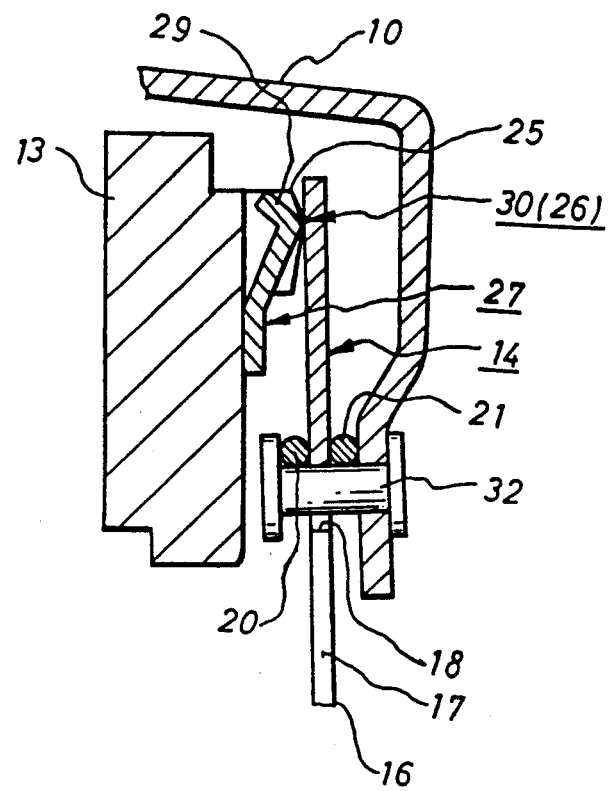
FIG. 3 is a vertical sectional schematic partial view showing another embodiment.

In the embodiment shown in FIG. 3, a construction is illustrated wherein the wave wire ring 28 is omitted by providing an axial elasticity to the lever 29 itself. In the embodiment of FIG. 3, a stud pin 32 is used in place of the tab 19 explained in FIG. 1 and FIG. 2.

Figure 4:
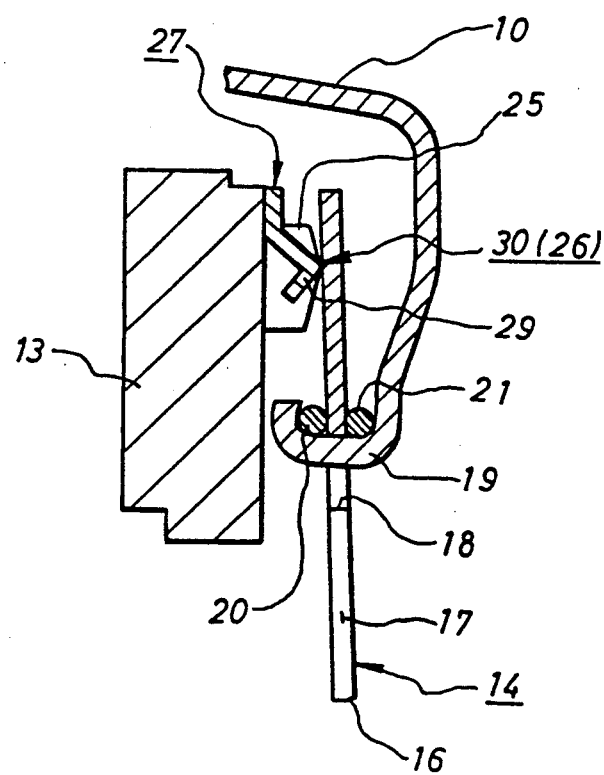
FIG. 4 is a vertical sectional schematic partial view showing further another embodiment.

In the embodiment shown in FIG. 4, a construction is illustrated wherein the bearing plate 27 is disposed at an outer peripheral side of the projection 25 and the lever 29 is formed on an inner peripheral edge.

Also in the constructions shown in FIG. 3 and FIG. 4, the releasing fulcrum point 30 formed by the lever 29 causes the initial torque at time of clutch engagement to increase smoothly. In addition, since the releasing fulcrum point 30 is disposed on the same circumference as that of the loading fulcrum point 26 of the projection 25, the durability can be improved and the troubles as encountered in the prior art can be eliminated.

What is claimed is:

1. A clutch cover assembly comprising:
   an annular pressure plate;
   a diaphragm spring disposed at a backside of and in coaxial relation to said pressure plate, said pressure plate having a plurality of projections extending at a backside of said pressure plate, said plurality of projections arranged in the same circumferential direction with a clearance left between each said projection and projecting to an outer peripheral part of said diaphragm spring, each said projection having a loading fulcrum point supporting an outer peripheral part of said diaphragm spring at time of clutch engagement, wherein an annular bearing plate is installed in a coaxial relationship between said pressure plate and said diaphragm spring, the bearing plate integrally having a releasing fulcrum point which is disposed in the clearance and elastically supporting the outer peripheral part of said diaphragm spring by being distorted in an axial direction, wherein said releasing fulcrum point and said loading fulcrum point are arranged on the same circumference; and
   a spring member displaceable in an axial direction interposed between said pressure plate and said diaphragm spring.

2. A clutch cover assembly as set forth in claim 1, in which the spring member is a wave wire ring.

* * * * *